J. C. JUNKIN.
FEEDER SPREADER FOR THRASHING MACHINES.
APPLICATION FILED DEC. 7, 1920.
1,406,395.
Patented Feb. 14, 1922.
2 SHEETS—SHEET 1.
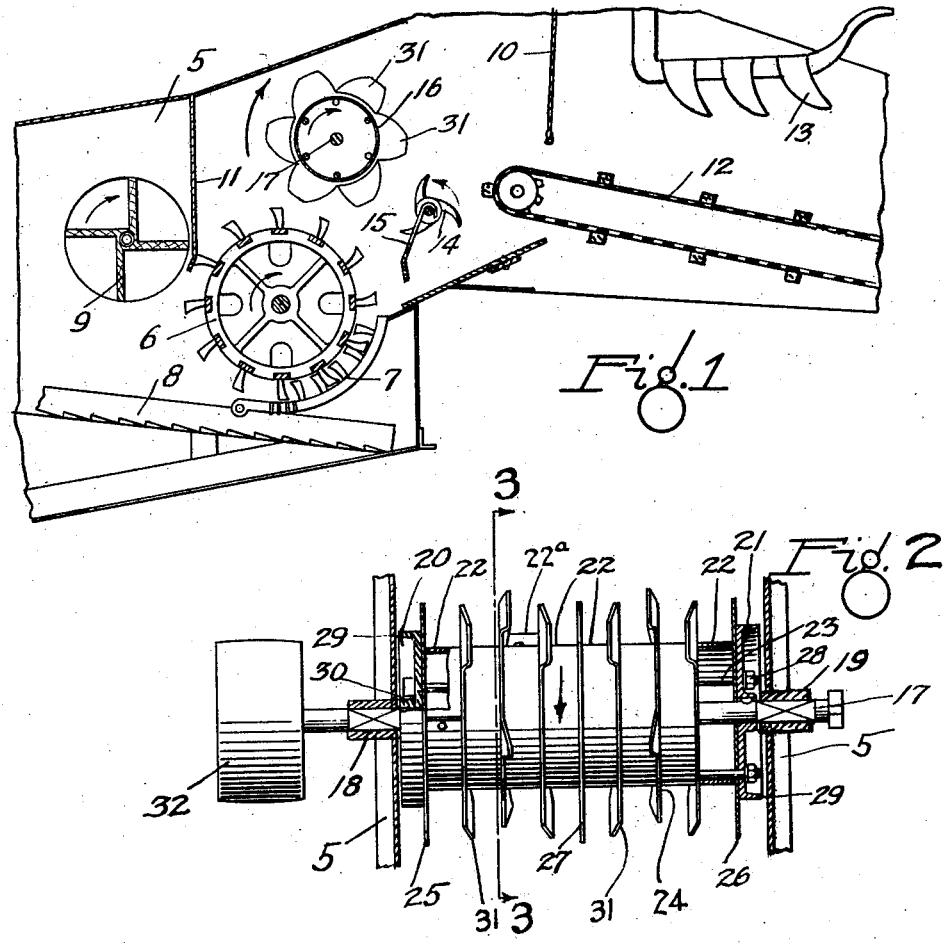
Fig. 1
Fig. 2
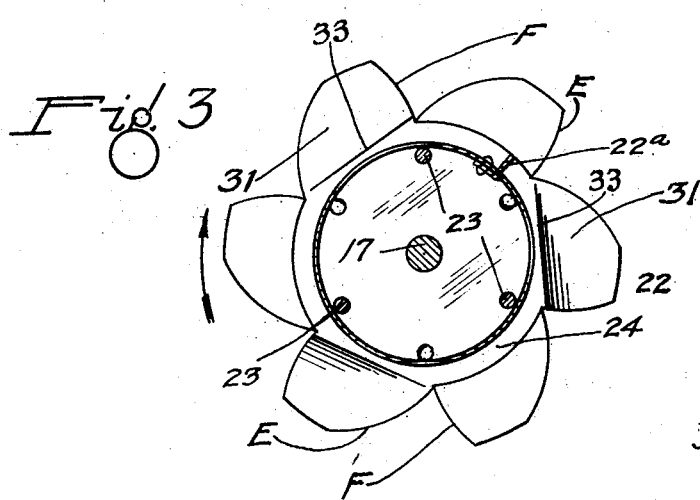
Fig. 3
Inventor
JOHN. C. JUNKIN
By Paul Paul
HIS ATTORNEYS

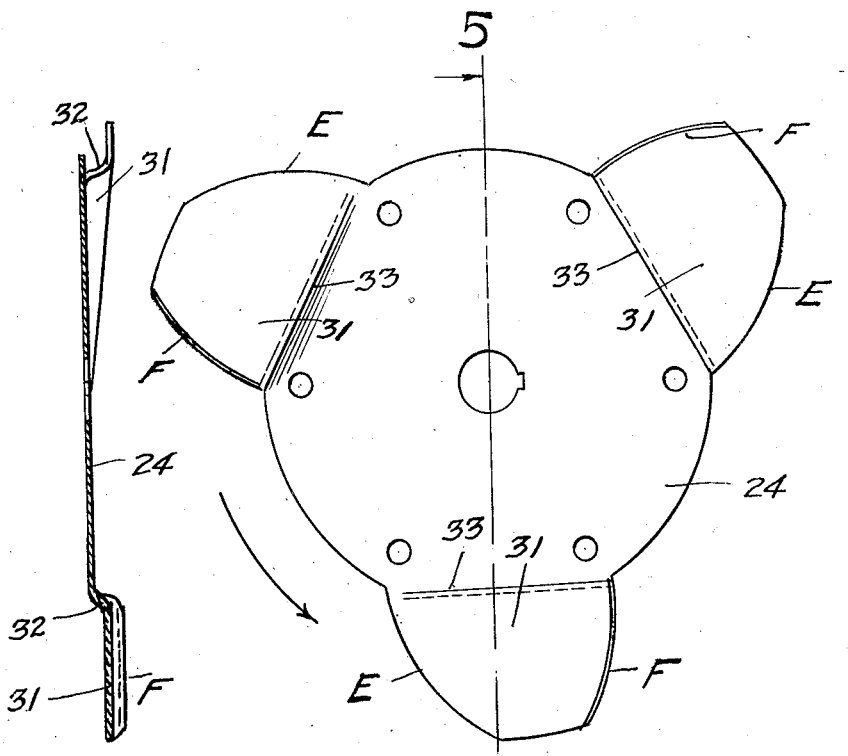
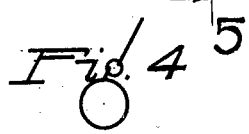
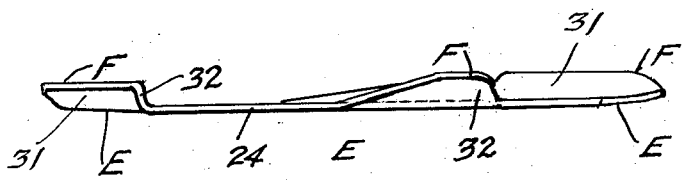

UNITED STATES PATENT OFFICE.

JOHN C. JUNKIN, OF MINNEAPOLIS, MINNESOTA, ASSIGNOR TO MINNEAPOLIS STEEL & MACHINERY COMPANY, OF MINNEAPOLIS, MINNESOTA, A CORPORATION OF MINNESOTA.

FEEDER SPREADER FOR THRASHING MACHINES.

1,406,395.　　　　　Specification of Letters Patent.　　Patented Feb. 14, 1922.

Application filed December 7, 1920. Serial No. 428,903.

*To all whom it may concern:*

Be it known that I, JOHN C. JUNKIN, a citizen of the United States, resident of Minneapolis, county of Hennepin, State of Minnesota, have invented certain new and useful Improvements in Feeder Spreaders for Thrashing Machines, of which the following is a specification.

My invention relates to improvements in devices for spreading the straw of grain bundles and distributing it evenly to the thrashing cylinder after the bands of the bundles have been cut as the bundles are delivered to the band cutters by the self feeder.

The object of the invention is to provide a spreading or distributing cylinder and feeder that will be simple of construction and at the same time will be increasingly efficient in operation.

My invention consists in certain constructions and combinations, as will be hereinafter described and particularly pointed out in the claims, with reference to the accompanying drawings, in which, Figure 1 is a sectional view through the front end of a thrashing machine and portion of a self feeder, Figure 2 is an elevation of the spreading cylinder partly in section, Figure 3 is an enlarged section on the line 3—3 of Figure 2, Figure 4 is a detail elevation of one of the spreading discs composing the cylinder.

Figure 5 is a section on line 5—5 of Figure 4, and,

Figure 6 is an edge view of the disc.

In the drawings, 5 represents the thrashing machine frame, 6 the thrashing cylinder, 7 the concave, 8 the grain pan, 9 the wing beater and 10 and 11 curtains for preventing the escape of grain. 12 represents the self-feeding apron by which the bundles of grain are fed under the band cutting knives 13 to cut the bands of the bundles, then to the retarder 14 and past the retarder guard 15 to the thrashing cylinder 6. All of these parts may be of ordinary construction and form no part of the present invention. Above the cylinder 6 and slightly to the front thereof is arranged the spreading cylinder 16, having the shaft 17 mounted in suitable journal bearings 18 and 19. The cylinder 16 is composed of heads 20 and 21 between which is assembled a series of spacing collars or rings 22 supported upon tie rods 23, each ring being provided with a wing 22ª. The spreading discs 24 of the cylinder are arranged between the spacing rings 22 and between the end rings 22 and the heads 20 and 21 are annular discs 25 and 26 respectively and a similar disc 27 is arranged centrally of the cylinder between the rings 22, dividing the cylinder in two sections. The tie rods 23, of which there are preferably three, pass through the heads 20 and 21 and the cylinder from end to end and are at each end provided with a threaded nut 28 by means of which the whole assembly is securely clamped together. The heads 20 and 21 are preferably provided with a peripheral flange 29 by which the clamping nuts 28 are protectively concealed and with a hub 30 by which they are supported and secured to the shaft 17.

The spreading discs 24 are formed with three projecting segments or blades 31 (see Figure 4) and these blades are twisted and deflected as shown in Figure 5 and Figure 6, from the base of the blade outwards, the forward edge E of the blade being deflected angularly by a lateral bend 32 along the base line 33 of the blade, the bend 32 gradually diminishing to zero at the rear edge E which retains substantially a straight profile with the plane of the disc.

The discs are assembled in staggered relation in the cylinder and when so assembled and the cylinder rotated the threads of the spiral of the deflected blades moves in the opposite direction from the center outwards on the sections of the cylinder separated by the disc 22ᶜ.

In operation, the cylinder is driven by means of the pulley 32 in the direction shown by the arrow in Figure 1, the grain bundles are fed by the apron 12 past the cutting knives 13 where their bands are severed after which the loose bundles pass over the slow running retarder 14 and come directly against the spreading cylinder 16. The angular or spiral deflections of the rapidly rotating blades passing through the loose straw produce rapid spreading impulses outwards from the center towards both ends of the cylinder and equally rapid downward impulses towards the thrashing cylinder, aided by the wings 22ª, which effectually loosens and separates the straw into a uniform loose mass and feeds the grain to the thrashing cylinder evenly over the whole surface of the thrashing cylinder.

The bundles leaving the feed apron are retarded and tilted upwardly, the lower forward ends thereof engaging the thrashing cylinder, while the upper or outer portions are engaged by the revolving spreader and the grain opened up and spread out to the sides. This combination of the retarding device, the thrashing cylinder and the spreader is an important feature of the invention.

The details of construction may be modified in various ways and still be within the scope of my invention.

I claim as my invention:

1. A rotatable spreading and distributing cylinder comprising a series of spacing rings having projecting wings, and a series of spreading discs having deflecting and angular blades.

2. In a rotatable spreading and distributing device the combination with a shaft, of a cylinder comprising a series of spacing rings, heads between which said rings are mounted, discs between said rings, some of said discs having projecting blades and sections of said blades being angularly and spirally deflected with respect to the axis of rotation of said cylinder and tie-rods for clamping said heads, said rings and said discs together.

In witness whereof, I have hereunto set my hand this 1" day of December 1920.

JOHN C. JUNKIN.